3,657,176
STABLE POLYACRYLAMIDE DISPERSIONS
Lanny A. Robbins, Midland, Mich., assignor to The Dow Chemical Company, Midland, Mich.
No Drawing. Filed Apr. 9, 1970, Ser. No. 27,162
Int. Cl. C08f 29/00
U.S. Cl. 260—29.6 M                3 Claims

ABSTRACT OF THE DISCLOSURE

Fluid compositions which are resistant to gelling and remain easily dispersible in water during extended storage consist of particulate linear polyacrylamide containing 10–50 percent of acrylate moieties in its molecular structure dispersed in essentially saturated aqueous calcium chloride.

BACKGROUND OF THE INVENTION

The present invention relates to a fluid composition comprising a water-soluble polymer, which composition provides a convenient means for rapidly and evenly dispersing the polymer in water.

Water-soluble polymers such as essentially linear polyacrylamides and modified polyacrylamides are useful as flocculating agents in sewage and ore suspensions, drainage aids in paper pulp suspensions, and additives in similar aqueous systems. For such uses, it is desirable to be able to disperse the polymer rapidly and evenly in the aqueous medium. Such dispersion, however, often proves to be extremely difficult to achieve in actual practice. If a finely divided solid polymer is added to water, the particles tend to cling together and agglomerate into slowly dissolving clumps unless special care is taken to disperse the particles mechanically while introducing them into the water. An aqueous solution of the polymer can be used, but the viscosity of solutions of these polymers increases so rapidly with concentration that, in most instances, only impractically dilute solutions are sufficiently fluid to be handled conveniently.

Eilers and Parks, U.S. Pat. 3,306,870 disclose unstable dispersions of acrylamide polymers, particularly lightly cross-linked polymers, in concentrated aqueous solutions of various inorganic salts or alkali hydroxides. These dispersions have the property of gelling upon standing for a short time and so provide a convenient means whereby porous underground formations can be effectively sealed off and rendered essentially impermeable.

SUMMARY OF THE INVENTION

It has now been found that a certain class of polymers of acrylamide forms stable dispersions capable of indefinite storage at moderate temperatures without gelling when dispersed as a particulate solid in an essentially saturated aqueous solution of calcium chloride. These polymers are essentially linear polyacrylamides wherein 10–50 percent, preferably 15–30 percent of the monomer units in their molecular structure are acrylate units and the remainder are acrylamide units.

DETAILED DESCRIPTION

Polyacrylamides of this invention consist essentially of recurring units having the structural formulas

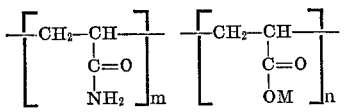

wherein M is a cation such as hydrogen, ammonium, or alkali metal, usually sodium, and the ratio $m/n$ may vary from about 9/1 to about 1/1, preferably from 5.67/1 to 2.33/1, as set forth above. In this structural representation of the polymer, it is to be understood that the acrylamide units and the acrylate units are in random distribution along the polymer chain. Polymers of this kind are described herein as essentially linear, by which term is meant polymers which may be branched in their molecular structure but wherein each molecule is essentially a single continuous chain and the chains are not cross-linked.

Such polymers can be made by copolymerizing acrylamide and an acrylate in appropriate proportions or, preferably, they are made by a partial hydrolysis of polyacrylamide, for example, by heating with aqueous alkali metal hydroxide as shown in U.S. Pat. 3,247,171 or by polymerizing acrylamide in the presence of aqueous sodium carbonate as shown in U.S. Pat. 3,022,279. Polymers having an average molecular weight of 100,000 to 10,000,000 can be used and polymers having average molecular weight in the higher range of three to ten million are preferred.

The proportion of polymer in the dispersion is not critical and is limited only by considerations of economic practicality and feasibility of handling. Ordinarly, about 1–8 pounds of polymer is suspended in a gallon of calcium chloride dispersion. Such dispersions have a consistency like paint and so are easily stirred, mixed, or pumped. The polymer can be finely divided flake material or, preferably, fine beads to make a more fluid and easily pourable composition. Polymer particles below 200 microns in diameter are preferred.

The calcium chloride brine is most desirably substantially saturated at ambient temperature. In order to assure continued stability regardless of minor changes in temperature, some solid calcium chloride may be present in the composition. Since the composition is ordinarily stored and used at about a reasonable room temperature, that is, at 15–40° C., the composition of the calcium chloride solution usually approximates that of the hexahydrate which contains 50.7 percent $CaCl_2$ and melts at about 30° C.

EXAMPLE

A suspension was prepared by mixing 140 parts by weight of polyacrylamide beads in 120 parts of 50% aqueous $CaCl_2$. The beads were of 150 microns average diameter and the polymer was polyacrylamide of about three to ten million average molecular weight which had been partially hydrolyzed with aqueous sodium carbonate by the process of U.S. Pat. 3,022,279 to contain about 20–25% acrylate moieties. The polymer contained about 8% of water. This suspension was stored for 9 months at 20–30° C. without any visible indication of gelation or other change. The polymer remained essentially instantaneously dispersible when the suspension was poured into water.

A similar suspension was made up as described above using a finely divided flake form of the same polymer. This suspension was also stable on extended storage and otherwise had the same properties as the bead suspension.

In contrast to the stability of the above suspensions, otherwise similar suspensions of polyacrylamide of both medium and high molecular weight (about one million and 4 million respectively) and containing only about 5 percent acrylate units in their molecular structures formed solid gels in saturated calcium chloride solution on standing at room temperature for 3 to 5 days.

I claim:
1. A stable fluid composition comprising a particulated essentially linear polymer of acrylamide wherein 10–50 percent of the monomer units in the molecular structure are acrylate units and the remainder are acrylamide units dispersed in an essentially saturated aqueous solution of calcium chloride.

2. The composition of claim 1 wherein 15–30 percent of the monomer units in the acrylamide polymer are acrylate units.

3. The composition of claim 2 wherein the polymer has an average molecular weight of 3–10 million.

References Cited

UNITED STATES PATENTS

| | | | |
|---|---|---|---|
| 3,056,757 | 10/1962 | Rakowitz | 260—29.6 |
| 3,210,310 | 10/1965 | Holbert et al. | 260—29.7 |
| 3,306,870 | 2/1967 | Eilers et al. | 260—29.6 |
| 3,493,500 | 2/1970 | Volk et al. | 210—54 |

MELVIN GOLDSTEIN, Primary Examiner